3,547,595
PROCESS FOR THE CONTINUOUS PREPARATION OF CRYSTALLINE SUBSTANCES
Hervé Olivier and André Vermot, Chalon-sur-Saone, France, assignors to L'Air Liquide, Societe Anonyme pour l'Etude et l'Exploitation des Procedes Georges Claude
Filed Jan. 19, 1967, Ser. No. 610,267
Claims priority, application France, Feb. 15, 1966, 49,644
Int. Cl. B01d 9/02; C01b 15/12
U.S. Cl. 23—295
9 Claims

ABSTRACT OF THE DISCLOSURE

A process for the continuous preparation of crystalline substances with predetermined dimensional regularity, quality and quantity while eliminating clogging and deposition on the walls of the apparatus by direct precipitation from at least two compound solutions reacting chemically with one another wherein a bed of crystalline particles is supported by a stream of ascending current of mother liquor, the current of mother liquor flowing in a closed main circuit in a descending portion and an ascending portion in succession, separated by a zone of substantially zero circulation speed.

---

Figure 1:
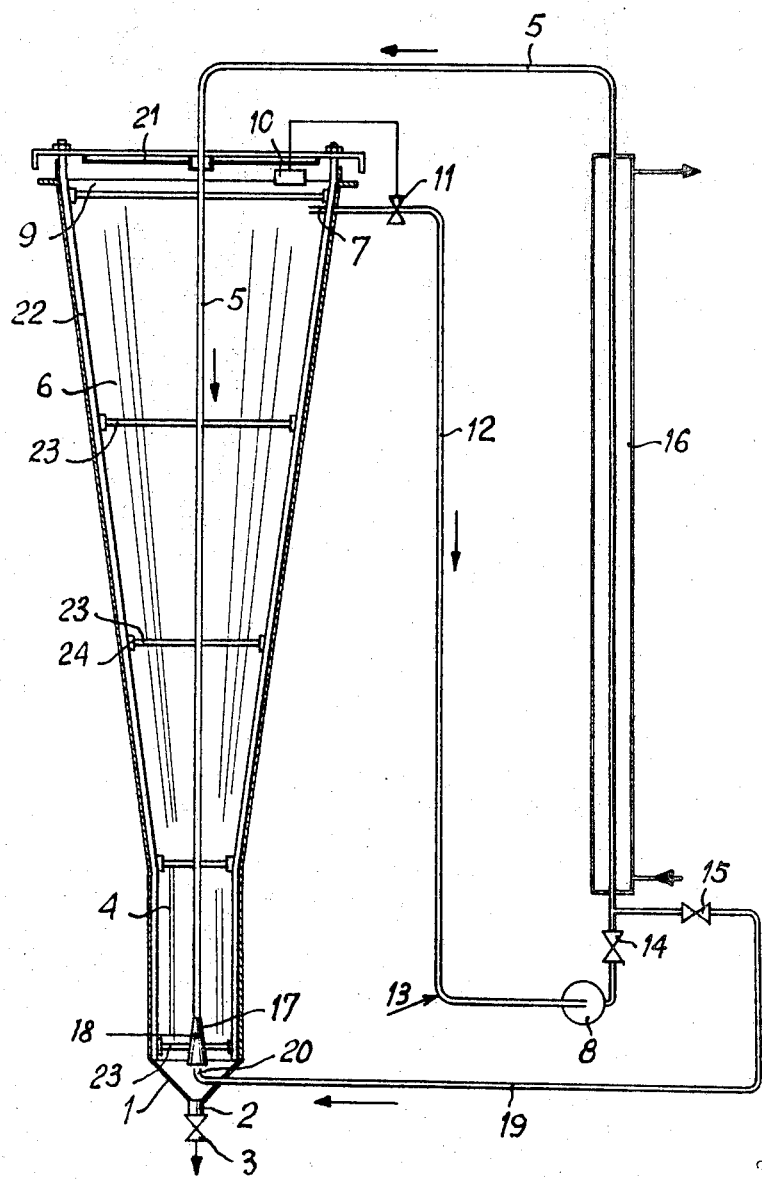

The present invention relates to a process for the continuous preparation of crystalline substances of mineral or organic nature. It enables the crystallised product to be obtained as particles of regular and determined dimensions by a direct and continuous preparation method.

Crystallisation arrangements have already been described which are directed to continuously obtaining regular crystals by cooling or partial evaporation of super-saturated solutions. In these arrangements, the crystals increase in size in suspension in a current circulating along a closed circuit, into which the product is introduced in the dissolved state and is extracted continuously or periodically in the solid state.

On the other hand, arrangements for the preparation of a mineral substance, in which a bed of particles is maintained in suspension by a cooled ascending current, are already known, particularly in accordance with British Pat. No. 911,664 issued Apr. 30, 1958, in the name of Laporte Chemicals Limited. This ascending current of super-saturated solution circulates in a vertical column, of which the upper portion has a progressively increasing section and in which the speed of circulation of the said current is reduced. In accordance with this process, the super-saturation of the ascending liquor current is produced in the same bed of particles.

French Pat. No. 1,187,352 issued Nov. 29, 1957, in the name of the Société d'Electrochimie, d'Electrométallurgie et des Aciéries Electriques d'Ugine, also describes a method for the continuous formation of agglomerates of determined dimensions from fine crystals, according to which single crystals are united by bringing them into suspension in a supersaturated solution of the same substance while subjected to continuous movement.

A process for the preparation of crystalline substances has been developed according to the invention, which has the advantages of obtaining a final product with a remarkable predetermined dimensional regularity, quality and quantity, by continuous production and while avoiding any clogging and any solid deposition on the walls of the apparatus.

This process differs from known processes by the fact that it uses the principle of the ascending current at decreasing speed not for obtaining a product crystallised by cooling or evaporating a solution of this product, but for obtaining a solid product resulting from the chemical reaction of reactants used in the form of solutions. On the other hand, it is distinguished therefrom by the fact that it does not use any continuous or intermittent supply of a preformed product. The precipitation results initially from solutions simply being brought into contact in the apparatus itself, the reaction of said solutions producing the expected crystalline product.

This new process permitting crystalline substance to be continuously obtained by direct precipitation from at least two chemical compounds reacting with one another and used in the form of solutions, in which a bed of particles is supported by an ascending current of mother liquor, is characterised by the following points, taken separately or in combination:

(a) A current of mother liquor flows through a closed main circuit, comprising in succession a descending portion and an ascending portion, separated by a zone with a substantially zero circulation speed;

(b) The compounds of which the reaction produces the final product by precipitation are introduced in solution into this current, outside the ascending portion of the closed circuit;

(c) One of the reactants is introduced into the descending portion of the circuit in the vicinity of the opening of this descending portion into the zone where the speed of circulation is subtsantially zero;

(d) The mother liquor is super-saturated outside the bed of particles;

(e) A secondary current of mother liquor is established in a direction such that it tends to cancel out the vertical speed of the main current and to establish a zone where the speed of circulation is practically zero;

(f) The secondary current is introduced in an ascending direction;

(g) The secondary current is introduced in a direction which is almost horizontal;

(h) The desired grain size is obtained by regulating the rate of flow of the mother liquor in the descending portion of the main current;

(i) The super-saturation of the mother liquor is increased by cooling, in a zone externally of the descending portion, ascending portion and the zone of substantially zero speed, as described above;

(j) The precipitation of the final product is effected essentially in the substantially zero speed zone and in the ascending portion of the circuit.

This process is sutiable for the preparation of numerous mineal or organic crystalline substance, such as sodium, potassium and ammonium persulphates, and particularly sodium perborate.

When the present invention is used in connection with sodium perborate, it has for its object a continuous process, according to which a bed of particles is supported in the reactor by an ascending current of mother liquor, the hydrogen peroxide and the sodium metaborate being introduced into the circulating mother liquor outside the bed of particles; the metaborate can also be prepared in situ, for example from borax.

The mother liquor flows in a closed circuit. Drawn in at the top of the reactor, it is saturated outside the latter, firstly by cooling in the exchanger and secondly by introduction of stoichiometric quantities of hydrogen peroxide, sodium metaborate, which latter may optionally be in excess, and stabiliser.

The super-saturated liquid is assured a circulation such that no crystallisation is produced before it is brought into contact with the bed of particles.

The major part of the mother liquor, forming the main current, is introduced into the lower part of the reactor through a tube extending from top to bottom of the apparatus. The remaining portion of the mother liquor, forming the secondary current, enters in counter-current through the base of the reactor and is directed in such a way as to create a zone in which the speed of circulation is substantially zero. The purpose of this counter-current, withdrawn from the line of circulation of the mother liquor, is to facilitate the deposition of perborate particles which have reached the desired size, this being by reducing the eddy caused at the exit of the main current.

The same effect of regular depositions of crystalline particles is obtained by replacing this secondary current by a fixed deflector, centered on the preferably divergent discharge of the main current, or by causing it to discharge horizontally through slots formed laterally in the tube by which the said secondary current is introduced.

The control of the rate of flow of the mother liquor in the circulation line permits of obtaining the desired grain size for the particles situated in the lowest part of the bed. The mean diameter of the particles is connected with the minimum rate of flow necessary for the fluidisation thereof.

For a given rate of flow of mother liquor, it is also possible to act on the grain size by the height of the apparatus, and thus by the residence time of the mother liquor in the reactor. It is thus possible to obtain a very high percentage of particles which are between two similar dimensions, the value of these latter being a function of the rate of circulation.

The reactor preferably has a section which increases in an upward direction.

This conical form of the reactor is designed to ensure a speed gradient for a given rate of flow of the ascending liquor. As the speed decreases in an upward direction, the result is an automatic grading of the particles: those having the desired dimension fall to the bottom of the reactor, where the product is extracted, the other particles being in dynamic equilibrium at a level which is higher as the particles are smaller, and descending in proportion with their growth.

The height of the bed of particles is only limited by the dangers of the apparatus becoming clogged when the quantity of grains in the column is too large and interrupts the circulation of the mother liquor.

In order to counteract the soiling of the walls, which is more to be feared in the external circulation line than in the reactor itself, it is possible to visualise two lines per apparatus, one being in operation while the other is being cleaned by reheating.

The particles which fall as they increase in size are liable to be deposited on the walls; in order only to obtain grains of the desired dimensions, it is also advantageous to return to the reaction medium the perborate which has not reached the desired grain size.

For this purpose, the walls are constantly swept over by a scraper system. This scraping arrangement can be formed by brushes, fixed on descending tubes bearing on the walls by means of adjustable resilient hoops. These brushes are of a flexible plastic material, such as flexible polyvinyl chloride, polytetrafluoroethylene, etc. The upper part of each tube is fast with a driving ring which rotates at the top of the apparatus and communicates its movement to the entire cleaning assembly. This arrangement thus ensures the cleanliness of the walls at the same time as the resuspension of the perborate grains which have not reached the desired size.

One installation for the continuous manufacture of crystalline substance, particularly sodium perborate, in accordance with the invention, will hereinafter be described by way of example and is illustrated on the accompanying drawings.

According to FIG. 1 of the accompanying drawing, the installation necessary for carrying the invention into effect comprises the reactor, inside which is effected the ascending circulation of the mother liquor and the descending movement of the crystals obtained by reaction and crystallisation, and the circulation outside this reactor.

This reactor comprises three parts. The upwardly flaring truncated base 1 is the zone where the speed of the liquid is zero, the solid product being deposited therein when it reaches the desired size. The minor base of the cone forms the bottom of the reactor 2 and permits the extraction of the perborate by way of one or more valves 3 which have direct flows and are of the quick-opening type. A single orifice of small section may serve the same purpose when it is constantly open.

Arranged above the truncated base 1 is a part 4 of constant section. In this zone of the reactor, the very super-saturated mother liquor is in contact with fairly large crystals. The strong super-saturation of the mother liquors also creates a liquid-solid exchange potential sufficient for bringing the grains to the required dimension. When this is reached, the crystalline product is deposited in the first part of the reactor.

The upper part of the truncated reactor 6 is flared upwardly to a section such that no appreciable nucleus of the solid product is any longer in suspension. Situated at this height is the intake 7 of the circulation pump 8. A height of liquid 9 sufficient to avoid any turbulence is maintained above this intake.

This part 6 of the reactor ensures an exhaustion of the mother liquors which arrive in the upper zone close to saturation point, at the same time as a grading of the crystalline particles as a function of their size.

It is possible to reduce the total height of the reactor by adopting several conicities calculated in such a way as to avoid any eddies. As a modification, the reactor can thus be made conical from the bottom.

In this reactor, a permanent exchange of material is assured between the mother liquors, which are desaturated as they ascend, and the crystalline particles, which increase in size as they descend. The crystalline particles are kept in suspension by the flow of mother liquor which is accurately regulated.

The circulation outside the reactor carries along the just saturated mother liquor drawn in at 7 by means of the valve 11 and the circuit 12 and saturated with a reactant, the metaborate, introduced at 13 into the circuit 12.

The mother solution is then brought under pressure by the pump 8, which delivers two currents by means of the valves 14 and 15. The main current is reintroduced, after cooling in the exchanger 16, to the base of the reactor through the tube 5 which descends in the centre of the reactor. The descending speed in this tube is very much higher than the ascending speed in the reactor.

The tube 5 ends in a divergent portion 17, into which the second reactant, the hydrogen peroxide, is introduced at 18.

Figure 2:
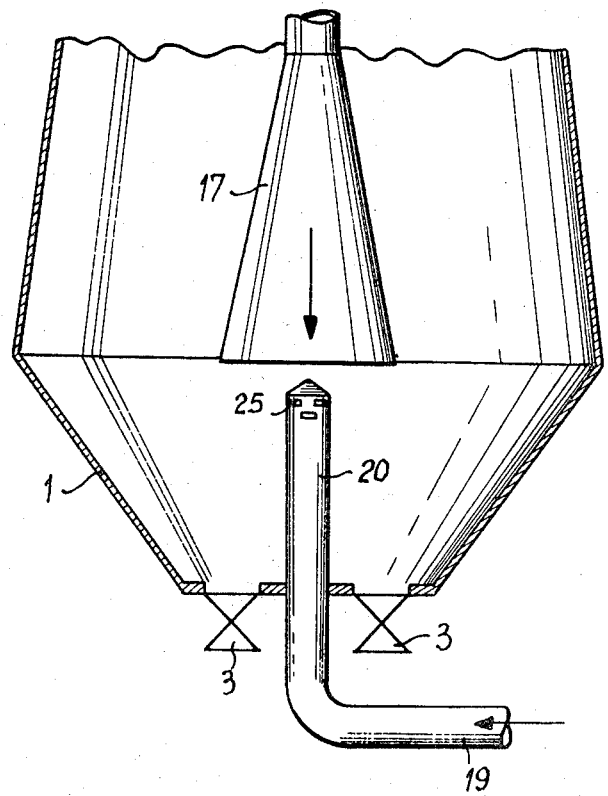

The secondary current, of which the rate of flow is smaller than that of the main current, is introduced, after passing through the valve 15 and the conduit 19, through the vertical tube 20 extending into the reactor through the bottom. In order to give the secondary current, on entering the reactor, a general direction close to the horizontal, and as can be seen from FIG. 2 of the accompanying drawing, which shows the details of the base of the reactor, the liquid discharges from the tube 20 through a series of slots 25 formed laterally in the cylindrical wall of the introduction tube. The main current being thus deflected, the result is the stablishment of a zone in which the speed of circulation of the liquid is very slow, being substantially zero, this facilitating the deposition of the finished product.

The cleaning of the internal face of the reactor by a scraper device applied resiliently to the walls does not cause any disturbance in the crystallisation phenomenon, due to a size reduced to a minimum in the reaction medium and a slow speed of rotation. This speed is of the order of a few revolutions per hour, in the case of sodium perborate.

An upper ring 21 carries at least three tubes 22 held bearing against the walls by resilient hoops 23. Fixed on these tubes are brushes which rub on the wall.

Figure 3:
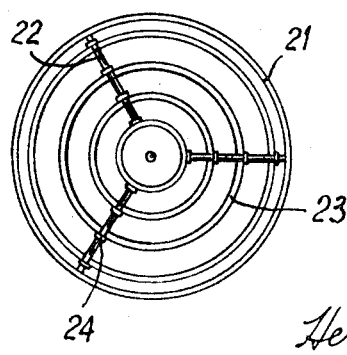

FIG. 3 of the accompanying drawing, which represents a plan view of the wall-scraper arrangement, shows the position of these different elements.

In a pilot apparatus in accordance with the accompanying drawings, it is possible to obtain an hourly production of 15 kg. of sodium perborate by supplying the apparatus with the corresponding quantities of hydrogen peroxide and sodium metaborate in a 200 g./l. solution, it being possible for this latter reactant to be introduced in an excess of 10%. The hydrogen peroxide employed is 70% by weight. The process provides the possibility of using the hydrogen peroxide in any concentration, provided that the solid content of the mixture of mother liquor and perborate extract is regulated so as to extract at the same time the volume of water of dilution of the reactants necessary for its production.

In this example, the rate of flow of the mother liquor in the reactor is established at 75 litres per minute, this corresponding to a speed of ascent of 2.8 cm. per second in the part of constant section, with a residence time of the perborate in the reactor regulated to be one hour. Crystalline products are obtained, of which the density and the grain size are set out in the following Table I:

|  | Density | Percent of refuse collected on screens with a mesh opening | | | | | | |
|---|---|---|---|---|---|---|---|---|
|  |  | $833\mu$ | $704\mu$ | $590\mu$ | $495\mu$ | $351\mu$ | $250\mu$ | $141\mu$ |
| After operating for 4 hours | 0.62 | 3 | 7 | 26 | 74 | 86 | 90 | 94 |

Under the above operating conditions, a crude sodium perborate is obtained with a crystallisation and grain size as regular as that given in Table I, that is to say, having an accumulated refuse of 60% between the screens of opening $590\mu$ and $351\mu$.

Using a reactor in which the cylindrical part has a length twice that indicated in FIG. 1 of the accompanying drawing, the rate of flow of mother liquor in the reactor being fixed so as to obtain a speed of ascent of 3.5 cm. per second in the constant section zone, and the residence time being adjusted to 2 hours, a product is obtained of which the grain size analysis is set out in Table II.

TABLE II.—PERCENT OF REFUSE ACCUMULATED ON SCREENS WITH A MESH OPENING

| $1,168\mu$ | $833\mu$ | $704\mu$ | $590\mu$ | $495\mu$ | $351\mu$ | $250\mu$ | $141\mu$ |
|---|---|---|---|---|---|---|---|
| 20 | 94 | 96 | 97 | 97.5 | 98 | 98.5 | 99.5 |

Under the above operating conditions, a crude sodium perborate is obtained with regular particles and a perfectly satisfactory grain size as corresponds to Table II, that is to say, giving 74% of refuse between the screens of opening $1168\mu$ and $833\mu$.

What we claim is:

1. A process for the continuous preparation of crystalline substance of predetermined dimensions by direct precipitation from at least two compounds reacting chemically with one another, comprising:

establishing and maintaining a bed of crystalline particles supported by an ascending current of mother liquor, with said particles slowly descending said mother liquor comprising a solution of the reactants and product and said crystalline particles comprising said product;

removing ascending mother liquor from above said bed; super-saturating said mother liquor outside said bed of particles; and recirculating and reintroducing said mother liquor to said bed of crystalline particles in a descending current near the bottom of said bed, a zone of vertical component of practically zero circulation speed separating said descending current and said ascending current.

2. A process according to claim 1, characterized in that one of the reactants is introduced into said mother liquor along said descending current into the zone of practically zero circulation speed.

3. A process according to claim 2, characterized in that a secondary current of mother liquor is introduced in a direction such that it tends to cancel out the descend speed of said descending current of mother liquor and to provide said zone in which the speed of circulation is practically zero.

4. A process according to claim 3, characterized in that the secondary current is introduced in an ascending direction.

5. A process according to claim 3, characterized in that the secondary current is introduced in a direction close to the horizontal.

6. A process according to claim 1, characterized in that the desired grain size is obtained by regulating the rate of flow of the mother liquor in the descending current.

7. A process according to claim 1, wherein said supersaturating of the mother liquor is increased by cooling, said cooling taking place in a zone externally of said descending current, said ascending current and said zone of practically zero speed.

8. A process according to claim 1, characterized in that the precipitation of the final product is effected essentially in the practically zero speed zone.

9. A process according to claim 1, applicable to continuously obtaining particles of sodium perborate of predetermined dimensions characterized in that the two compounds reacting chemically are sodium metaborate and hydrogen peroxide, respectively, and used in the form of aqueous solutions.

References Cited

UNITED STATES PATENTS 2,863,740  12/1958  Christensen _____ 23—301
3,041,137  6/1962  Youngman _____ 23—60

FOREIGN PATENTS 911,661  11/1962  Great Britain _____ 23—60

NORMAN YUDKOFF, Primary Examiner

A. F. PURCELL, Assistant Examiner

U.S. Cl. XR.

23—273, 301, 60